T. W. A. WEST.
ORE CONCENTRATOR.
APPLICATION FILED SEPT. 10, 1909.

1,038,046.

Patented Sept. 10, 1912
7 SHEETS—SHEET 2.

WITNESSES
S. M. Gallagher
Francis O'Rock

INVENTOR
Thomas W. A. West
BY
ATTORNEY

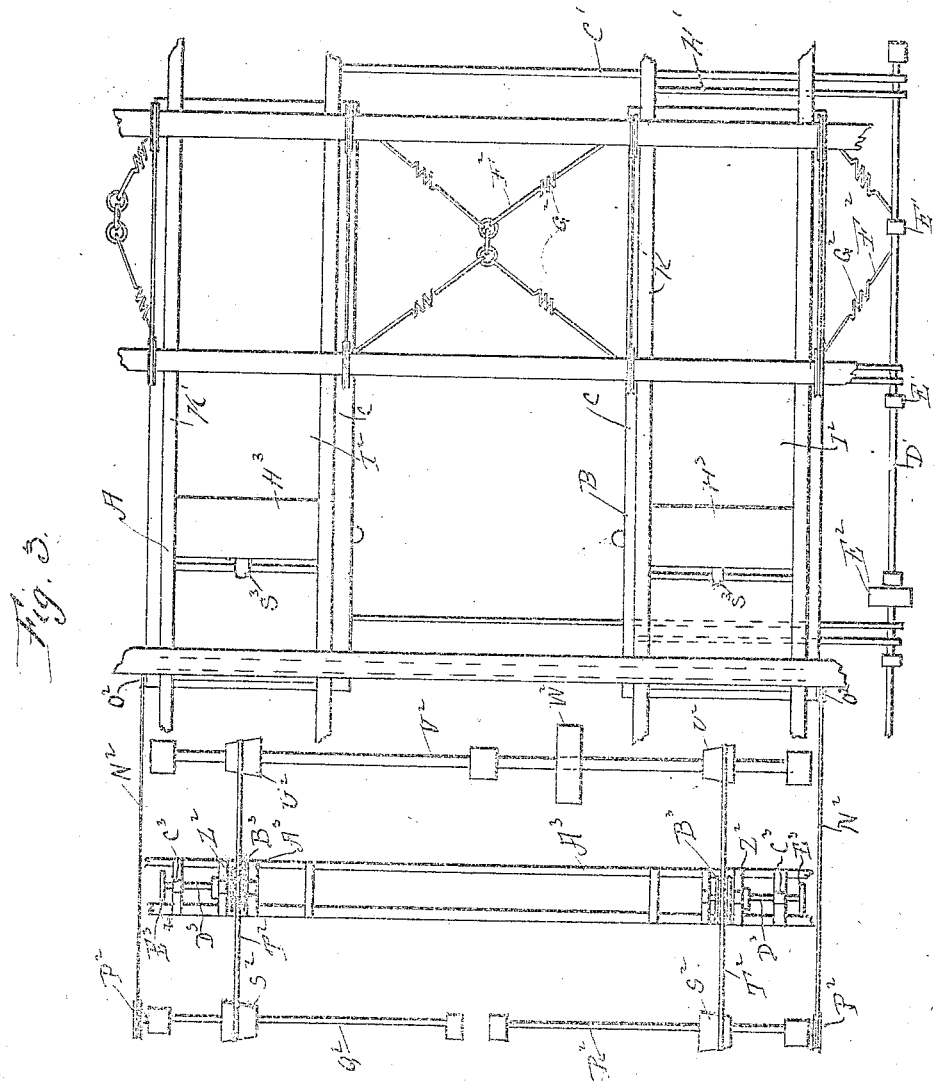

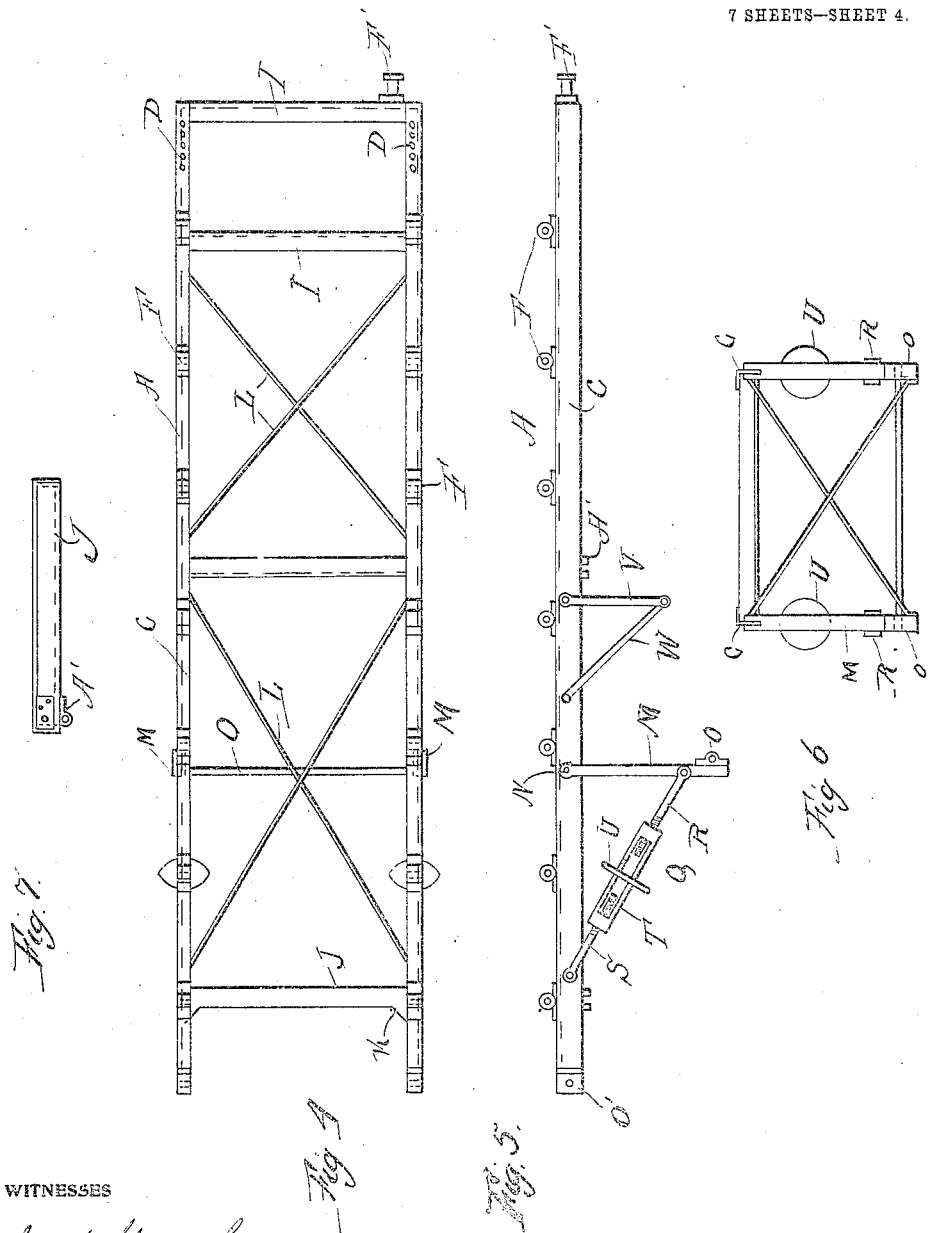

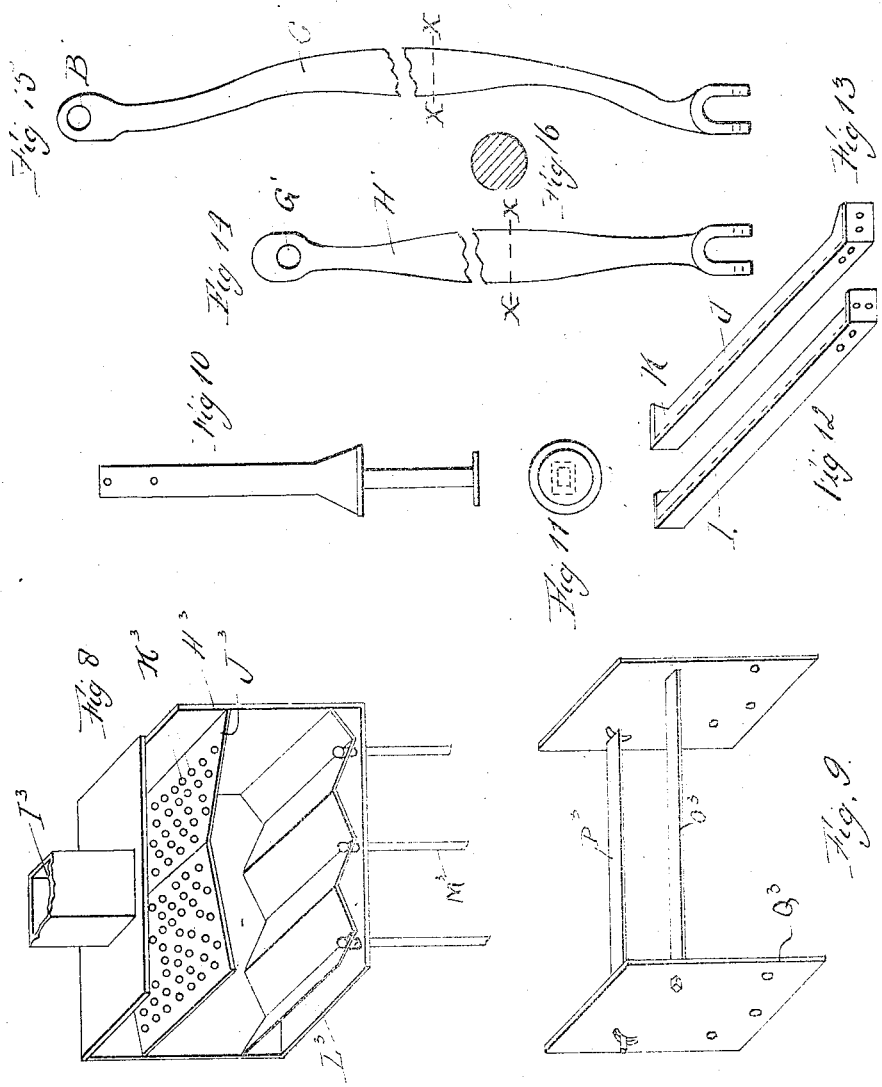

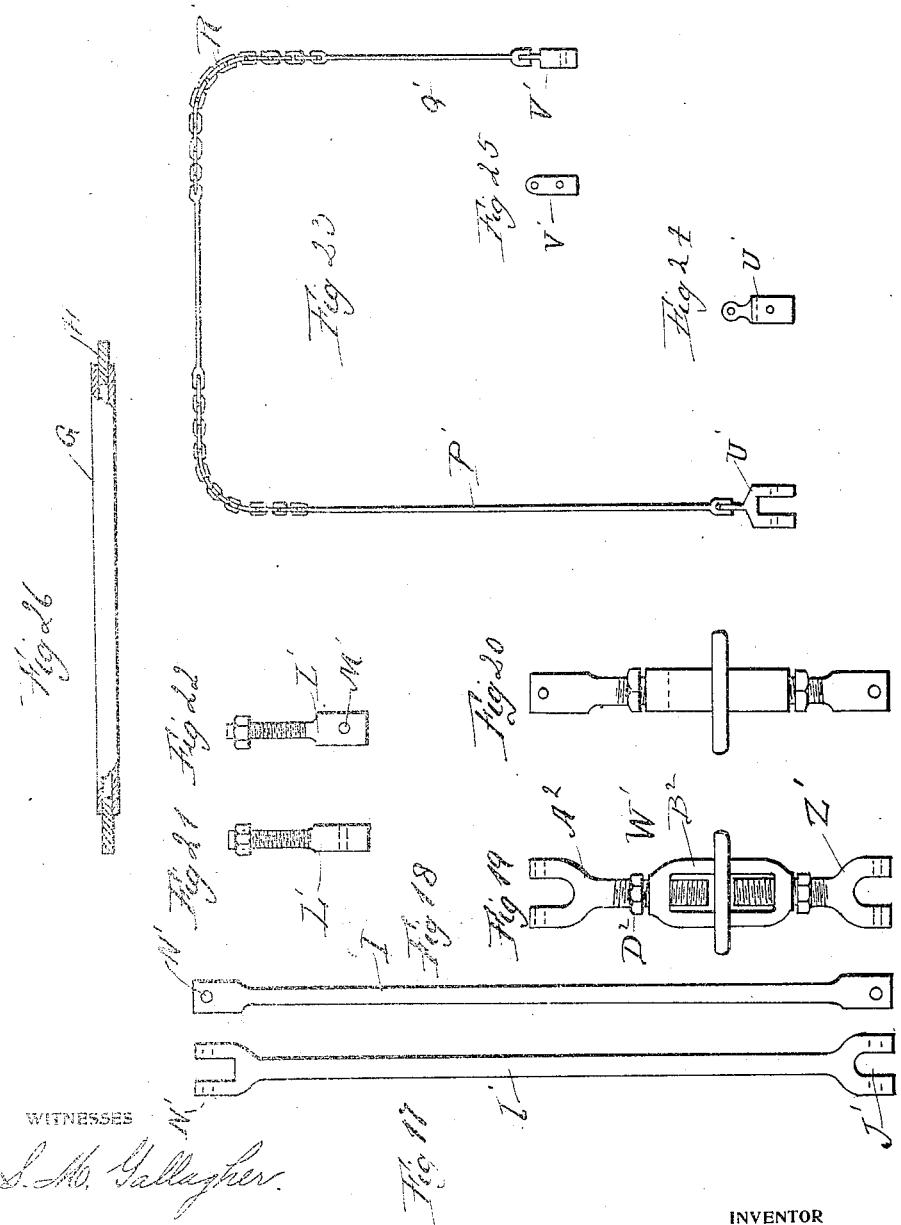

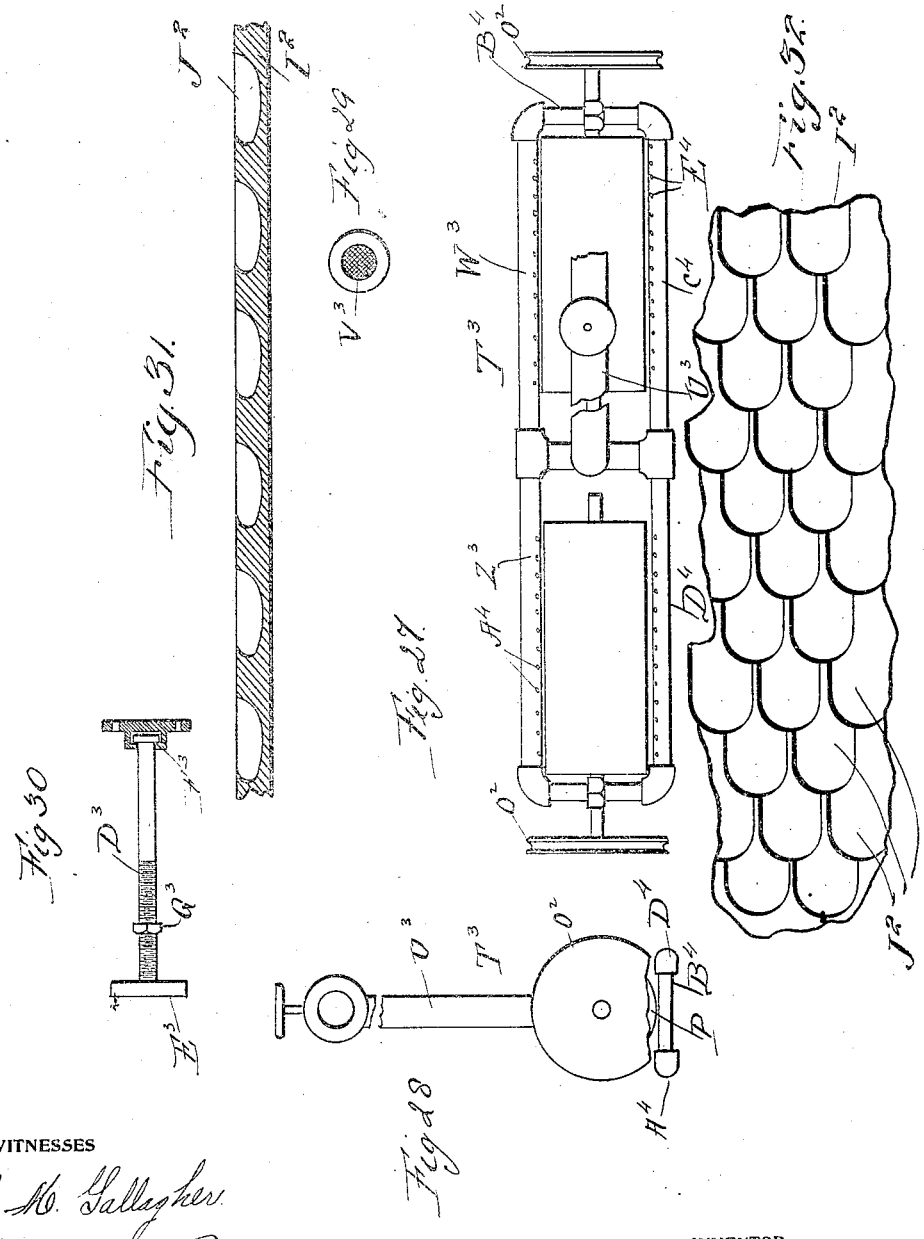

UNITED STATES PATENT OFFICE.

THOMAS W. A. WEST, OF OCOTLAN, OAXACA, MEXICO.

ORE-CONCENTRATOR.

1,038,046.  Specification of Letters Patent.  Patented Sept. 10, 1912.

Application filed September 10, 1909. Serial No. 517,107.

*To all whom it may concern:*

Be it known that I, THOMAS W. A. WEST, a citizen of the United States, residing at Ocotlan, State of Oaxaca, Republic of Mexico, have invented a certain new and useful Improvement in Ore-Concentrators, of which the following is a specification.

My invention relates to a new and useful improvement in ore concentrators, and has for its object to provide an exceedingly simple and effective device of this character which will be so operated as to produce approximately the same motion as is used in hand panning.

The present invention relates to the reciprocating type of concentrator, the improvement having for its object the introduction of improved means for adjusting the tables so that said adjustment may be brought to the point which is most effective for separating the mineral carrying constituents from the non-mineral bearing and lighter material as will hereinafter appear.

Other objects of the invention are to so construct the concentrator that it will require less power, less attention, less expense of installation, and less expense of repairs than the concentrator generally in use.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
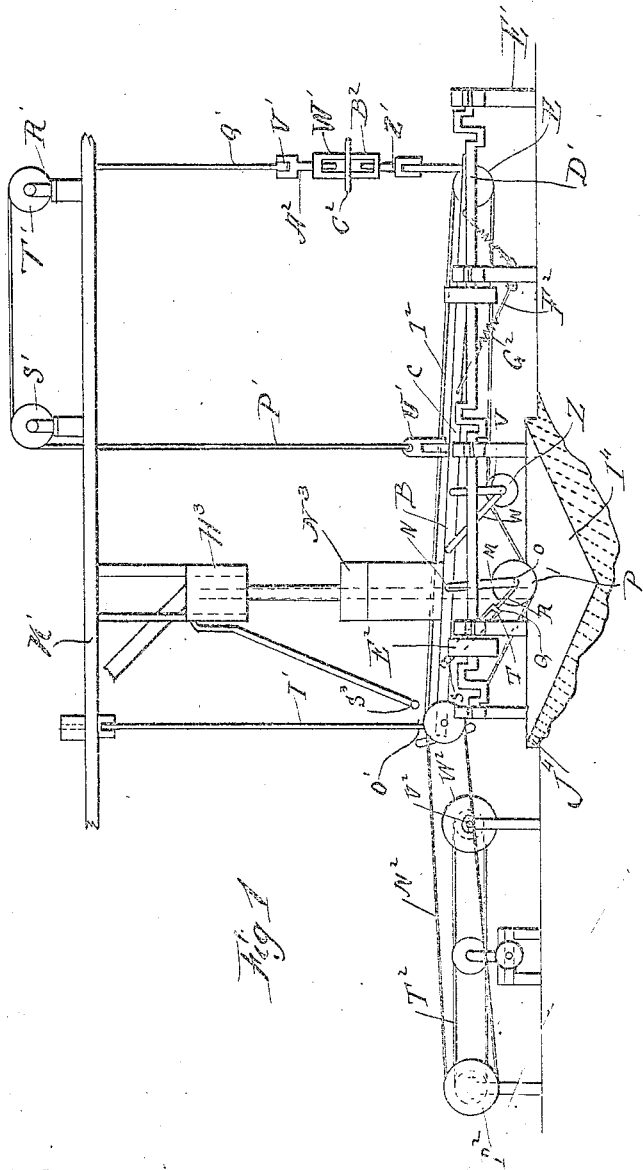
Figure 2:
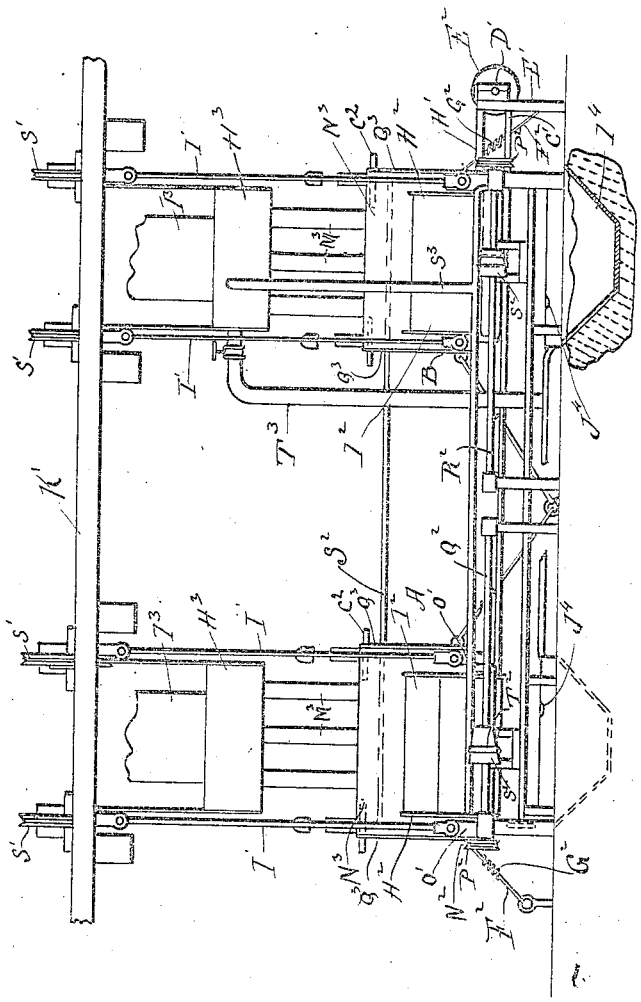

Figure 1 is a side elevation of a concentrator made in accordance with my improvement. Fig. 2, a front elevation thereof. Fig. 3, a plan view. Fig. 4, a plan view of one of the table frames. Fig. 5, a side elevation thereof. Fig. 6, an end view. Fig. 7, a side elevation of one of the cross braces. Fig. 8, a perspective view of the distributing box, two sides and a portion of the body being removed to show the construction of the same. Fig. 9, a perspective view of the adjustable frame which is bolted to the table for holding one of the distributing boxes. Fig. 10, a side elevation of one of the anchor posts. Fig. 11, a bottom view thereof. Fig. 12, a perspective view of one of the cross braces. Fig. 13, a similar view of another cross brace. Fig. 14, a side elevation of one of the pitmen, it being broken to show that they may be of any desired length. Fig. 15, a similar view of a modified form of pitman adapted to pass outside the pitman shown in Fig. 14. Fig. 16, a sectional view at the line $x$—$x$ of Figs. 14 and 15. Fig. 17, a side elevation of one of the rods for suspending the tables. Fig. 18, a similar view at right angles to Fig. 17. Fig. 19, a side elevation of the adjusting turn buckle. Fig. 20, a similar view at right angles thereto. Fig. 21, a side elevation of one of the bolts to which the upper end of the suspending rods are connected. Fig. 22, a similar view at right angles to Fig. 21. Fig. 23, a side elevation of the equalizing or compensating device. Fig. 24, a side elevation of the connector on one end of the compensating device. Fig. 25, a similar view on the opposite end of the compensating device. Fig. 26, a side elevation of one of the small rollers, portions thereof being shown in section to more clearly show their construction. Fig. 27, a plan view of the water connections whereby the concentrates are washed from the belts. Fig. 28, an end view thereof. Fig. 29, a view showing the screen in the water supply pipe. Fig. 30, a plan view of the adjusting bolt showing the manner in which it is connected to the belt shifting device. Fig. 31, a sectional view of my improved clam shell concentrator belt. Fig. 32, a plan view of a section of said belt.

In carrying out my invention as here embodied, A and B represent the reciprocating tables having the sides C, in the rear ends of which are formed a number of openings D for securing the bearings of the rolls E, so that said rolls may be adjusted within certain limits for lengthening or shortening the concentrator belt, to be hereinafter described.

On the side pieces C are placed the bearings F, in which are journaled the small rollers G, said rollers being formed of tubing, having their ends closed with short steel rods H, which act as shafts for said rollers. The sides C are held together by the cross braces I and J; said braces being similar except that the ends of the braces J are longer than those of the braces I, and the webs are formed on an angle, as indicated by K, in proximity to the ends which assist in strengthening the cross braces near their ends. The tables may be further strengthened by the diagonal braces L. To the sides C are pivoted the depending brackets M at N, and on the lower ends of each of these brackets is mounted the shaft O, on which is placed the tightening roller P, and secured to the depending brackets M and the sides of the tables are the adjusting devices Q, which are composed of the threaded rods R and S, one of which has a right hand thread and the other a left hand thread formed thereon, and said rods being connected by the turn buckle T, which has a hand wheel U mounted thereon whereby it may be easily and readily turned, so that the rods R and S will be drawn toward or moved away from one another, thereby raising or lowering the depending bracket M.

V denotes a stationary depending bracket, which is held securely in the desired position by the rod W and mounted in the lower end of this stationary depending bracket V is a roll Z, over which runs the concentrator belt. To some suitable part beneath the tables are secured the brackets A', through which passes a bolt, said bolt passing through the opening G' in one end of the pitman H', the opposite end of the pitman being attached to the crank shaft D', which is journaled in the upper ends of the anchor posts E'. On the ends of the tables are bolted the wrist pins F' by which the pitmen are attached to the tables. The table nearest the crank shaft D' is connected to said crank shaft by the pitman H', while the table farthest from the crank shaft is connected thereto by the pitman G', the central portion of which is bent out of line with the two ends so that there will be sufficient room between the pitmen to keep them from interfering with one another.

The tables A and B are suspended from a scaffolding or the frame of the building in which the device is installed, the front ends being held up by the rods I', having their ends formed in the shape of a U, as indicated by J', the upper ends of said rods being fastened to the frame K' by the bolts L', having each the opening M' through which passes a pin, said pin also passing through the opening N' in the end of each of the rods I'; the lower ends of said rods are secured in a similar manner to the ears O', attached to the tables. The rear and central portions of the tables are suspended by the compensating device shown in Fig. 22, which is composed of the rods P' and Q' joined by the flexible connection R', which runs over the pulleys S' and T' secured to the frame K' above the points where the compensating device is connected to the table. To the end of the rod P' is attached a connection U' whereby said rod P' may be fastened to the table and to the lower end of the rod Q' is attached the connection V', and to this is fastened the upper end of the adjusting device W', which comprises the bolt Z' which is connected to the lower end of the table and the bolt $A^2$ which is connected to V'. One of these bolts has a left hand thread and the other a right hand thread, and on these is mounted the turn buckle $B^2$ having a hand wheel $C^2$ formed therewith, whereby said turn buckle may be easily manipulated. Mounted on the bolts are lock nuts $D^2$ which when the correct adjustment has been attained are jammed against the ends of the turn buckle $B^2$ which will prevent the same from turning.

From the foregoing description it will be seen that when the turn buckle $B^2$ is turned it will either raise or lower the table, and as the suspending device shown in Fig. 22 has a flexible connection between the two rods P' and Q' the center portion of the table will be lowered the same as the rear portion.

The crank shaft D' to which the pitmen are connected is so arranged that as it revolves the tables will be first brought toward and then moved away from one another, which movement will balance the different parts of the mechanism so that the strain will not be very great upon any part, and to this crank shaft is connected a pulley $E^2$ by which power may be transmitted to said crank shaft.

In order that the tables may be kept in alinement I secure thereto the guys $F^2$, the opposite ends of which are attached to the anchor posts E', and if found desirable these guys may be formed of two parts connected together by a spring $G^2$, which will allow an extra amount of movement and also act as a cushion when the tables are reciprocated. At each end of the tables is journaled a roll E having a flange $H^2$, and over these rolls passes the rubber concentrator belt $I^2$. The clam shell riffled belt $I^2$ has a number of indentations $J^2$ formed therein, which are somewhat similar to one half of a clam shell, that is, they are elongated and gradually slant downward from one end toward the other, then curve upward with a very sharp turn and this will have a tendency to keep the concentrates after they have once entered the indentations from leaving the same. The rolls E are driven by the belts $N^2$ which pass over the grooved pulleys $O^2$ connected to the shafts of the rolls E, and over the grooved pulleys $P^2$, one of which is mounted on the shaft $Q^2$ and the other one on the shaft $R^2$, on which are also mounted the cone pulleys $S^2$ over which pass the belts $T^2$, which pass over other cone pulleys $U^2$ secured to the shaft $V^2$, and on this shaft $V^2$ is mounted a pulley $W^2$ whereby power may be transmitted to the shaft $V^2$.

From the foregoing description it will be seen that when the shaft $V^2$ is revolved it will do likewise with the cone pulleys $U^2$ which will cause the cone pulleys $S^2$ to revolve through the medium of the belts $T^2$, which will put the shafts $Q^2$ and $R^2$ in motion, thereby revolving the rolls E, through the medium of the grooved pulleys $O^2$ and $P^2$ and the belts $N^2$, and this will cause that portion of the concentrator belts which are above the tables to move from the rear toward the front of the tables.

$Z^2$ denotes carriages slidably mounted upon the frame $A^3$ and in these carriages are journaled the grooved guide pulleys $B^3$, over which run the belts $T^2$. On the frame $A^3$ are mounted the lugs $C^3$, through which are threaded the screws $D^3$ having a handle or wheel $E^3$ on one end thereof so that they may be readily turned, the opposite ends of said screws being swiveled in the carriages $Z^2$, as indicated by $F^3$, so that as the screw $D^3$ is revolved it will cause the carriages to move backward or forward, and when the right adjustment is secured the lock nut $G^3$ which is mounted on the screw $D^3$ may be brought in contact with the lug $C^3$ thereby holding the carriages in the desired adjustment.

From the foregoing description it will be seen that as the carriages are moved the belts $D^2$ will be moved in one direction or another, which will change the speed of the shafts $Q^2$ and $R^2$, causing the concentrator belts to run faster or slower.

The driving parts which were just described, and which are used to drive the concentrator belts may be situated in any convenient place, but are here shown as being in front of and below the forward end of the tables for convenience.

$H^3$ is a stationary equalizing box, having a receiving opening $I^3$, whereby the pulp may enter the equalizing box from the batteries. When the pulp enters the box it will flow down upon the deflecting plate $J^3$ which is perforated as indicated by $K^3$, so that the pulp will slowly and evenly pass through the deflector $J^3$ on to the corrugated distributing plate $L^3$, said plate slanting from the rear to the front of the box, and from the lowest points of the distributing plate $L^3$, run the flexible tubes $M^3$, and these enter the distributing box $N^3$, which may be similar to the equalizing box $H^3$. The said distributing box is fastened to the strap irons $O^3$ and $P^3$, which are movably secured to the plates $Q^3$, said plates being bolted to the tables, a short distance back of their front ends.

The strap iron $O^3$ is secured to the plates $Q^3$ in such manner that it may be rotated, but the ends of the strap iron $P^3$ extend through curved slots $R^3$, so that it may be moved up and down in the arc of a circle, and on the ends of the strap $P^3$ will be threaded suitable nuts so that when the desired adjustment is obtained said nuts may be tightened against the plates $Q^3$ so as to hold said straps and likewise the distributing box in the desired adjustment.

As the pulp enters the equalizing box it will be spread out by the deflecting plate $J^3$ and will gradually pass through the openings $K^3$ where it will drop on to the distributing plate $L^3$, then it will run down said plate into the flexible tubes $M^3$, through which it will enter the distributing box $N^3$, from which place it will pass on to the concentrator belts. From this point the pulp will be driven downward and rearward over the belts by a stream of water entering through the water supply pipe $S^2$. This water will cause the lighter material or that which does not contain ore to pass over the indentations in the concentrator belts and pass off into a suitable sewerage system, the remaining or ore bearing material to flow into the indentations in the concentrator belts and will be carried upward thereby until the belt is passing around the forward roll, at which time the stream of water from the supply pipe $S^3$ will wash back any slimes which happen to be carried from the distributing box to this point. As the belts pass around the rollers P other streams of water will be played thereon from the washing system $T^3$, which is composed of the supply pipe $U^3$ leading from the equalizing box $H^3$, having a screen $V^3$ interposed therein and connected to this supply pipe $U^3$ are the reduced distributing pipes $W^3$ and $Z^3$ which have a plurality of openings $A^4$ formed therein. Connected to these distributing pipes are the connecting pipes $B^4$, to the opposite ends of which are connected the distributing pipes $C^4$ and $D^4$, having perforations $E^4$ formed therein, and these are also connected to the supply pipe $U^3$.

From this description it will be seen that as the belts holding the concentrates pass around the lower rollers P, the water from the washing system will be played upon said belts, which will dislodge the concentrates and wash them into the vat $I^4$, which has an overflow $J^4$ so that when the water has reached a certain height it will pass off into the sewerage system. It will be noticed that there is no strong flow of water into the vat so that the water will not be agitated to prevent the concentrates from settling. If found desirable the depending bracket M may be made sufficiently long that when it is in a vertical position the roller P carried thereby will be in proximity to the top of the water in the vat, so that the concentrator belt passing under this roller will pass through the water, which would assist in removing any of the concentrates should they stick to the belt.

In practice the pulp is conveyed from the batteries to the equalizing box, from which place it passes to the distributing box, which is adjustably secured above the tables, through the flexible tubes M³. From the distributing box it passes on to the concentrator belts I², which are moving upward and forward over the tables A and B, which are being reciprocated, thereby imparting a reciprocating motion to the concentrator belts. At the same time these motions are taking place water is flowing over the belts, carrying the light material off the belt and leaving the heavier or ore bearing material in the indentations formed in the belts, then as the material which remains in the belt until it passes beneath the roller F, is washed from the belt at this point by the washing system T³, it will cause the concentrates to drop into the vat I⁴ from which place it may be removed in any well known manner.

Having thus fully described my invention, what I claim as new and useful, is—

1. In an apparatus of the class described, a frame carrying a concentrator, suspending means for one end of said frame, and a hanger connected to the other end of the frame and to an intermediate point between said ends, said hanger having a flexible section passing around a support, and means for changing its length.

2. In an apparatus of the class described, a frame carrying a concentrator, pivoted suspending means for one end of said frame, a hanger connected to the other end of said frame and to an intermediate point between said ends, said hanger having a flexible section passing around overhead rollers, means forming a part of said hanger whereby its length may be changed, and means for imparting to said frame transverse vibratory movements.

3. In an apparatus of the class described, a frame carrying a concentrator, pivoted suspending means for one end of said frame, a hanger comprising tension rods connected by a flexible section, and means on one of said rods for changing the length of the hanger, and over-head rollers around which said flexible section passes, one end of said hanger being attached to the belt frame at the end opposite the suspending means and to a point intermediate its ends, and means for imparting transverse vibrations to the belt frame.

4. A concentrator having a plurality of transverse series of relatively narrow, longitudinally curved pockets abruptly curved at each end and the lower ends provided with lips overhanging the pockets to retain concentrates, the pockets of each series being staggered with respect to those of the adjacent series.

5. A concentrator belt having a plurality of transverse series of relatively narrow, longitudinally curved pockets formed in the body thereof, said pockets being abruptly curved at each end and the lower ends provided with lips overhanging the pockets to retain concentrates, the pockets of each series being staggered with respect to those of the adjacent series.

In testimony whereof, I have hereunto affixed my signature in the presence of two subscribing witnesses.

THOMAS W. A. WEST.

Witnesses:
H. L. BARON,
GEO. WILSON.